United States Patent [19]
Bradford

[11] Patent Number: 5,900,149
[45] Date of Patent: May 4, 1999

[54] SEDIMENTER

[75] Inventor: Peter Francis Bradford, Kent, United Kingdom

[73] Assignee: Lucas Industries Public Limited Company, United Kingdom

[21] Appl. No.: 08/919,035

[22] Filed: Aug. 27, 1997

[30]     Foreign Application Priority Data

Aug. 30, 1996 [GB] United Kingdom ................... 9618169

[51] Int. Cl.$^6$ .................................................. B01D 21/02
[52] U.S. Cl. ........................ 210/521; 210/532.1; 210/540
[58] Field of Search .................................. 210/519, 521, 210/532.1, 540, 262

[56]                References Cited

U.S. PATENT DOCUMENTS

| | | | |
|---|---|---|---|
| 2,573,615 | 10/1951 | Senilles ................................... | 210/521 |
| 2,793,186 | 5/1957 | Dunell et al. ........................... | 210/521 |
| 2,799,645 | 7/1957 | Musgrove ............................... | 210/521 |
| 3,067,878 | 12/1962 | Genter et al. ........................... | 210/521 |
| 3,718,257 | 2/1973 | Bach ....................................... | 210/521 |
| 3,912,533 | 10/1975 | Heyer ...................................... | 127/13 |
| 4,048,069 | 9/1977 | Cuvillier et al. .......................... | 210/84 |
| 4,122,016 | 10/1978 | Tao et al. ................................. | 210/540 |
| 4,425,239 | 1/1984 | Jacocks et al. .......................... | 210/521 |
| 5,013,435 | 5/1991 | Rider et al. .............................. | 210/521 |
| 5,032,273 | 7/1991 | Senyard, Sr. et al. ................... | 210/521 |
| 5,089,136 | 2/1992 | Cyr ........................................... | 210/521 |
| 5,248,421 | 9/1993 | Robertson ............................... | 210/512.1 |
| 5,340,470 | 8/1994 | Hedrick et al. .......................... | 210/532.1 |
| 5,605,636 | 2/1997 | Wyness .................................... | 210/519 |

FOREIGN PATENT DOCUMENTS

| | | |
|---|---|---|
| 2 704 769 | 11/1994 | France . |
| 33 18976 | 11/1984 | Germany . |
| 1 420 011 | 1/1976 | United Kingdom . |
| WO93/07946 | 4/1993 | WIPO . |
| WO95/01215 | 1/1995 | WIPO . |

OTHER PUBLICATIONS

Patent Abstracts of Japan, vol. 012, No. 143 (C–492), Apr. 30, 1988 & JP 62 258714 A (O H L:KK), Nov. 11, 1987.
Patent Abstracts of Japan, vol. 005, No. 062 (C–052), Apr. 25, 1981 & JP 56 015810 A (Kubota Ltd), Feb. 16, 1981.

*Primary Examiner*—Christopher Upton
*Attorney, Agent, or Firm*—Cesari and McKenna, LLP

[57]                ABSTRACT

A sedimenter comprises a housing having an inlet and an outlet. The housing defines a collection chamber located beneath and in communication with a sedimentation chamber. Flow path defining means, for example in the form of a baffle, located within the sedimentation chamber forces fuel flowing between the inlet and the outlet to follow a relatively long, tortuous flow path.

6 Claims, 7 Drawing Sheets

SEDIMENTER

This invention relates to a sedimenter for use in the separation of contaminants from a fuel supply for an engine.

It is usual to provide a filter in the fuel supply system for an engine in order to remove contaminants from the fuel supply. Such filters include a filter element which, over a period of time, become less efficient due to contaminants removed from the fuel gradually clogging the filter element. In order to increase the useful working life of a filter element, it is advantageous to provide a sedimenter in the fuel system to separate contaminants from the fuel supply prior to filtering the fuel supply, the sedimenter acting to remove large, high density contaminant particles from the fuel supply.

Current sedimenter designs for use in conjunction with or as part of a filter typically have a sedimentation area equal to the cross-sectional area of the sedimenter of approximately 45 cm$^2$. Such sedimenters function satisfactorily at flow rates of up to 50 l/hr. However, it is desirable to supply fuel at rates significantly higher than 50 l/hr, for example at approximately 200 l/hr. At these higher flow rates, sedimentation is less effective and larger contaminant particles continue with the flow of fuel than is the case at lower flow rates. Clearly, the presence of larger particles in the flow of fuel to the filter reduces the useful life of the filter and is disadvantageous.

It is an object of the invention to provide a sedimenter of relatively small dimensions which is capable of separating contaminants from a fuel supply at relatively high fuel flow rates.

According to the present invention there is provided a sedimenter for use in separating relatively dense contaminants from a flow of fuel, the sedimenter comprising a housing having an inlet and an outlet, the housing defining a contaminant collection chamber and a sedimentation chamber the collection chamber being located beneath and communicating with the sedimentation chamber, and flow path defining means located within the sedimentation chamber forcing fuel flowing between the inlet and the outlet to follow a tortuous flow path of relatively great length.

The flow path defining means conveniently defines a spiral-shaped flow path, the inlet conveniently communicating with a centre part of the spiral-shaped flow path whilst the outlet communicates with a radially outer part of the spiral-shaped flow path.

The provision of the flow path defining means may increase the effective area available for sedimentation. If the flow path means were not present, the flow of fuel through the housing would tend to follow the most direct route between the inlet and the outlet thus the effective area for sedimentation would be relatively low. By using an appropriate flow path defining means, the effective sedimentation area may be greater than the cross-sectional area of the sedimenter.

In use, vehicle motion can result in the water or other contaminants separated from the fuel being disturbed and reentering the sedimentation chamber. In conventional sedimenter arrangements, the water may flow directly through the sedimentation chamber to the outlet and continue towards the filter and remainder of the fuel system. The presence of the flow path defining means in the sedimentation chamber according to the invention reduces the risk of water and other contaminants already separated from the fuel from reaching the outlet as a result of such vehicle motion.

The invention will further be described by way of example, with reference to the accompanying drawings, in which.

Figure 1:
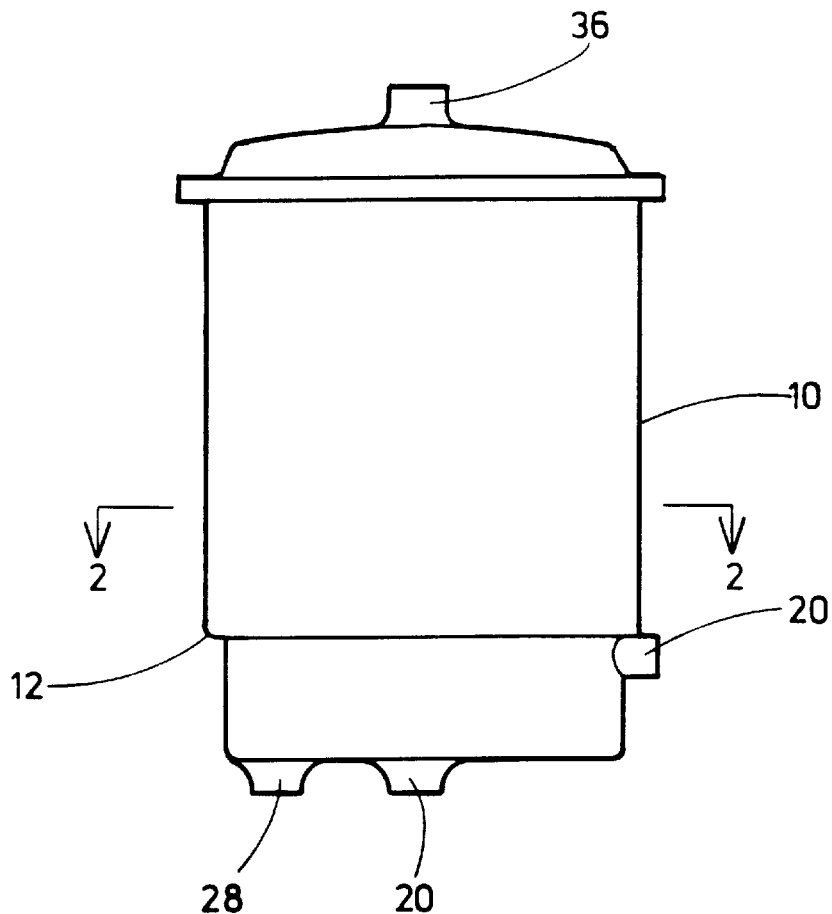
FIG. 1 is a side elevation of a sedimenter in accordance with an embodiment of the invention.
Figure 2:
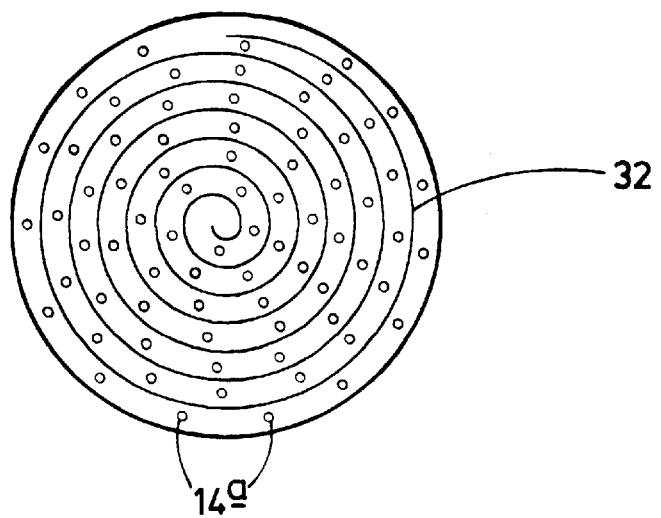
FIG. 2 is a sectional view along the lines 2—2 of FIG. 1.
Figure 3:
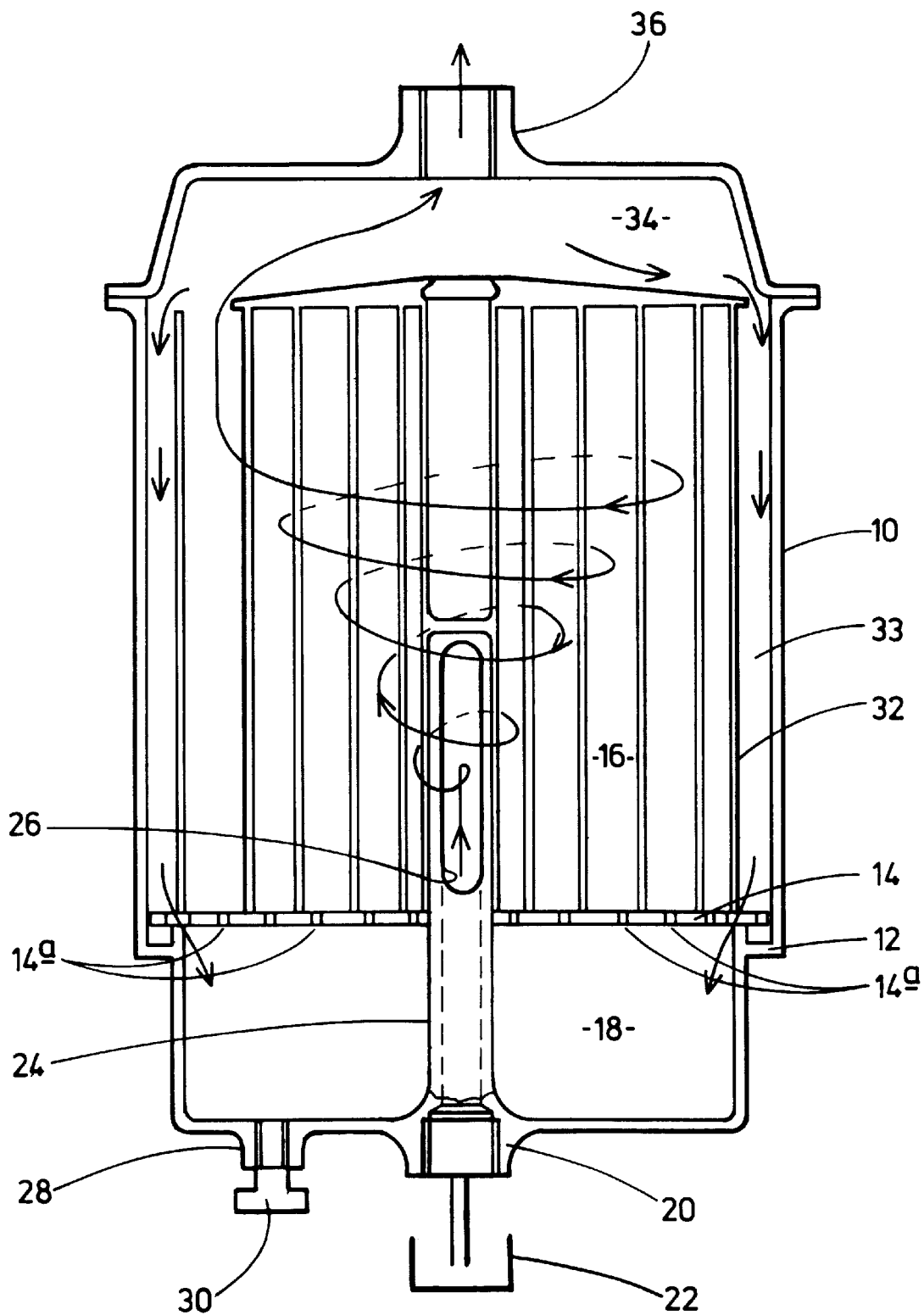
FIG. 3 is an enlarged diagrammatic sectional view of the sedimenter of FIG. 1.

The sedimenter illustrated in FIGS. 1 to 3 comprises a generally cylindrical housing 10 the cylindrical wall of which includes a step 12 which as illustrated in FIG. 3 supports a partition 14 which divides the housing 10 into an upper sedimentation region or chamber 16 and a lower collection chamber 18. The partition 14 is provided with a plurality of perforations 14a whereby communication is permitted between the sedimentation chamber 16 and collection chamber 18.

The lower wall of the housing 10 is provided with an inlet port 20 which is arranged to be supplied with fuel from a low pressure reservoir 22. The inlet port 20 is connected to an upwardly extending passage 24 which extends above the level of the partition 14, extending into the sedimentation chamber 16. The passage 24 includes an opening 26, the opening 26 being located completely within the sedimentation chamber 16 such that fuel supplied to the inlet 20 flows along the passage 24 and subsequently flows into the sedimentation chamber 16.

FIG. 1 illustrates an alternative arrangement in which rather than supplying fuel through an inlet provided in the lower surface of the housing 10, the part of the passage 24 extending through the collection chamber 18 extends radially and communicates with an inlet opening provided in the cylindrical wall of the housing 10 adjacent the step 12.

The lower surface of the housing 10 is also provided with an opening 28 including a tap arrangement 30 whereby flow through the opening 28 is controlled. In use, upon actuating the tap 30 to permit flow of fuel through the opening 28, contaminants collected within the collection chamber 18 may be drained therefrom.

The sedimentation chamber 16 houses flow path defining means 32 as illustrated in FIG. 2 to ensure that the flow path within the sedimentation chamber 16 is of substantially spiral-shaped form. The flow path defining means 32 may take the form of a simple spiral-shaped baffle located within the sedimentation chamber 16, the upper end of the flow path defining means 32 being closed by an annular cap, or alternatively may comprise a hollow tube which is wound so as to take a spiral form, the radially inner end of the tube communicating with the opening 26 provided in the passage 24.

The upper end of the radially outer part of the flow path defining means 32 communicates through an arcuate opening of relatively large area with an upper chamber 34 provided in the housing 10, and an outlet port 36 communicates with the upper chamber 34 whereby fuel is supplied to a filter arrangement from where it is supplied to a fuel injection pump to be supplied at high pressure to the cylinders of an associated engine.

An annular chamber 33 is defined between the flow path defining means 32 and the housing 10, the annular chamber 33 forming a flow path from the upper chamber 34 to the collection chamber 18. The upper chamber 34 is of dimensions such the fuel flows slowly therethrough, and hence further sedimentation is promoted. The upper end of the flow path defining means 32 is conveniently of conical form so that contaminants collected in the chamber 34 will tend to flow radially outwards, subsequently flowing through the annular chamber 33 to the collection chamber 18. The provision of the annular chamber 33 is not essential, the flow path defining means alternatively extending substantially to the wall of the housing 10.

It will be appreciated that the presence of the flow path defining means 32 in the sedimentation chamber 16 forces the fuel to flow over substantially the complete area of the partition 14, thus the effective sedimentation area of the sedimenter is increased compared to the situation that would occur if the flow path defining means 32 were omitted from the sedimenter. The increase in the effective sedimentation area of the sedimenter improves the efficiency of the sedimentation process, thus only relatively small diameter particles of contaminant continue with the flow of fuel through the outlet 36, the larger contaminants carried by the flow of fuel tending to move downwards under the action of gravity within the flow of fuel, these particles eventually impinging upon the partition 14 and flowing through the perforations 14a to be collected in the collection chamber 18. At appropriate intervals, the tap 30 is operated to permit removal of the contaminants from the collection chamber 18 through the outlet 28.

Figure 4:
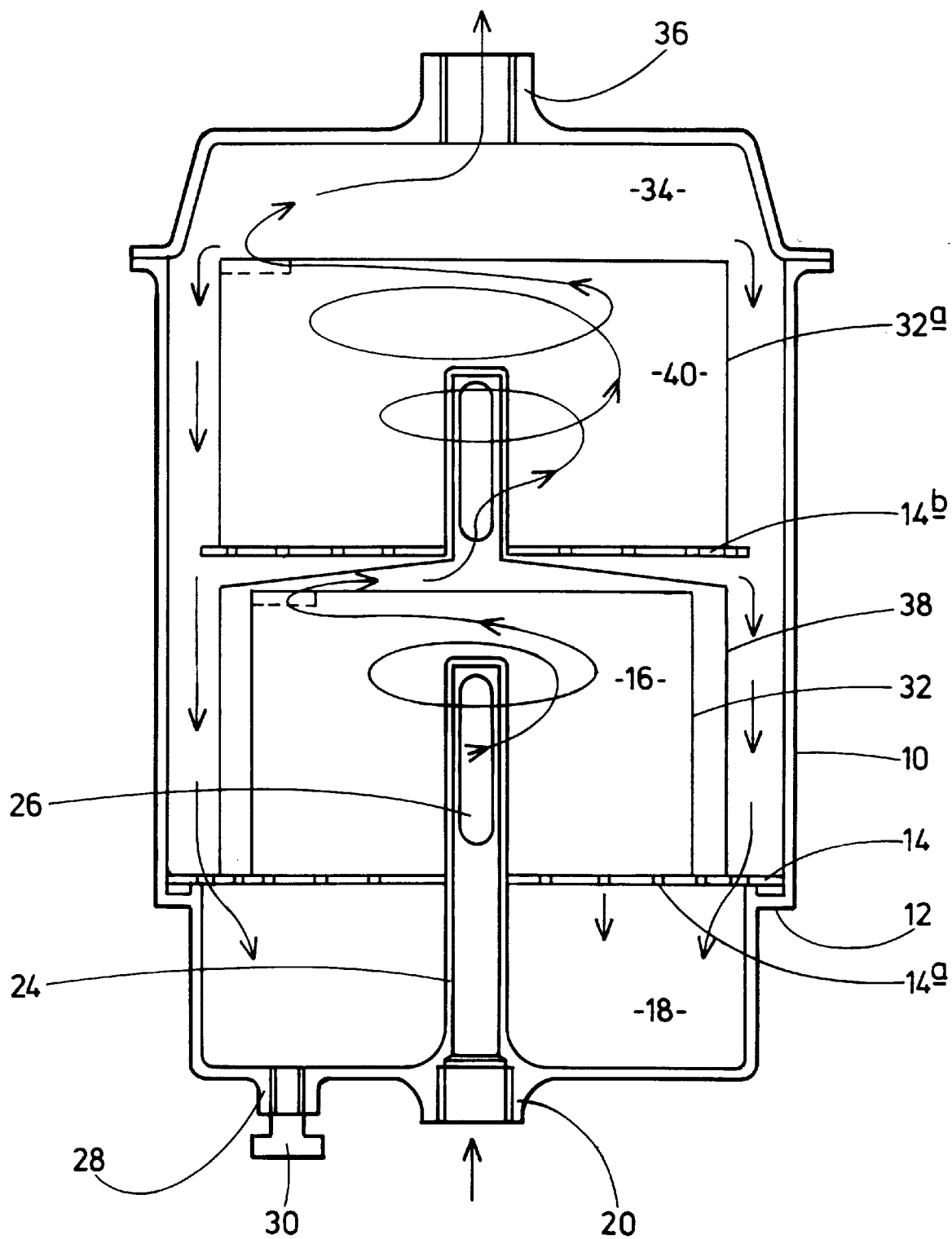
FIG. 4 is a view similar to FIG. 3 of an alternative embodiment.

In this embodiment, the flow path defining means 32 splits the sedimentation chamber 36 into regions the height of which extends across the full height of the sedimentation chamber 16. If the sedimentation process is occurring efficiently, the height of the flow path defining means may be reduced. Such a reduction in the height of the flow path defining means 32 permits a pair of such flow path defining means to be stacked one upon the other as illustrated in FIG. 4.

In this embodiment, once the fuel has flowed through the lower flow path defining means 32, the fuel is supplied to a second sedimentation chamber including a second flow path defining means 32a located above a first, lower sedimentation chamber 16. A partition 38 is located between the flow path defining means 32, 32a so that contaminants removed from the flow of fuel by the second flow path defining means 32a which pass through the apertures provided in a second perforated partition 14b located beneath the second flow path defining means 32a are carried around the lower flow path defining means 32 to pass through the perforated plate 14 and be collected in the collection chamber 18 as described hereinbefore. It will be appreciated that by stacking a pair of flow path defining means 32, 32a in the manner illustrated in FIG. 4, the total area available for sedimentation is increased without increasing the cross-sectional area of the sedimenter. The increased effective area for sedimentation results in a further reduction in the size of particles passing through the sedimenter, and hence results in a further increase in the useful life of a filter located in a subsequent part of the fuel system.

In the embodiments described hereinbefore, in order to restrict the flow of fuel from the inlet through the partition 14 to a radially inner part of the collection chamber, through the collection chamber to a radially outer part thereof, and through the partition 14 to the outlet, the perforations 14a are very small compared to the area available for fuel flow through the sedimentation chamber, thus the perforations 14a provide a sufficient resistance to flow to substantially prevent fuel taking such a route between the inlet and outlet. In addition, a restricted number of such perforations may be provided. It is envisaged that with a fuel flow area of the order of 300 mm$^2$, the drain area will be less than 30 mm$^2$.

Figure 5:
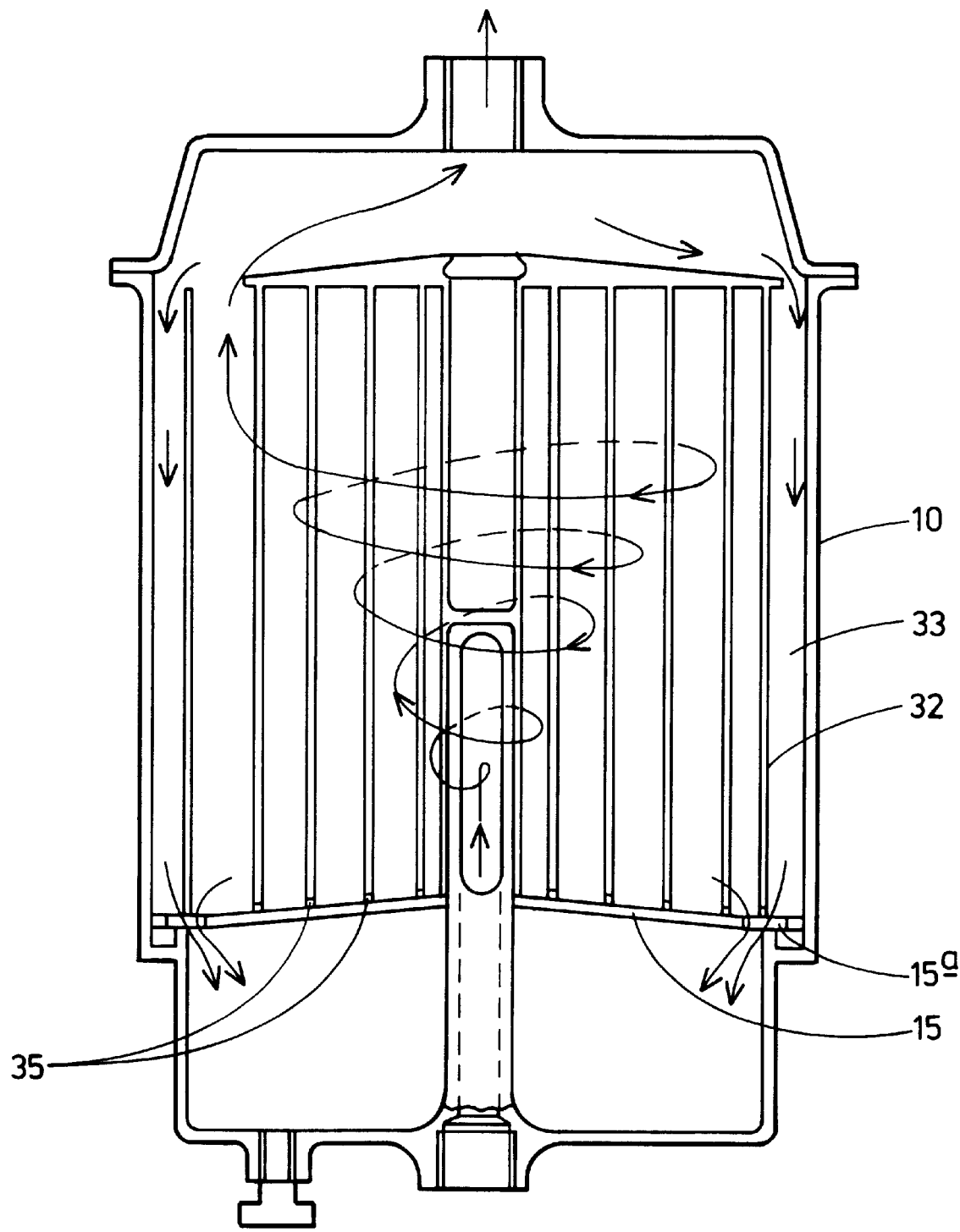
FIG. 5 is a view of a modification.

FIG. 5 illustrates a modification in which the perforated partition is replaced by a conical partition 15 having, adjacent its outer periphery, perforations 15a. The flow path defining means 32 has, adjacent its lower end, openings 35 for example by providing a castellated lower edge on the flow path defining means, whereby contaminants separated from the fuel flow radially outwardly and subsequently flow through the perforations 15a to the collection chamber. In further alternatives, streamline slots or trapment cowls may be used.

Figure 6:
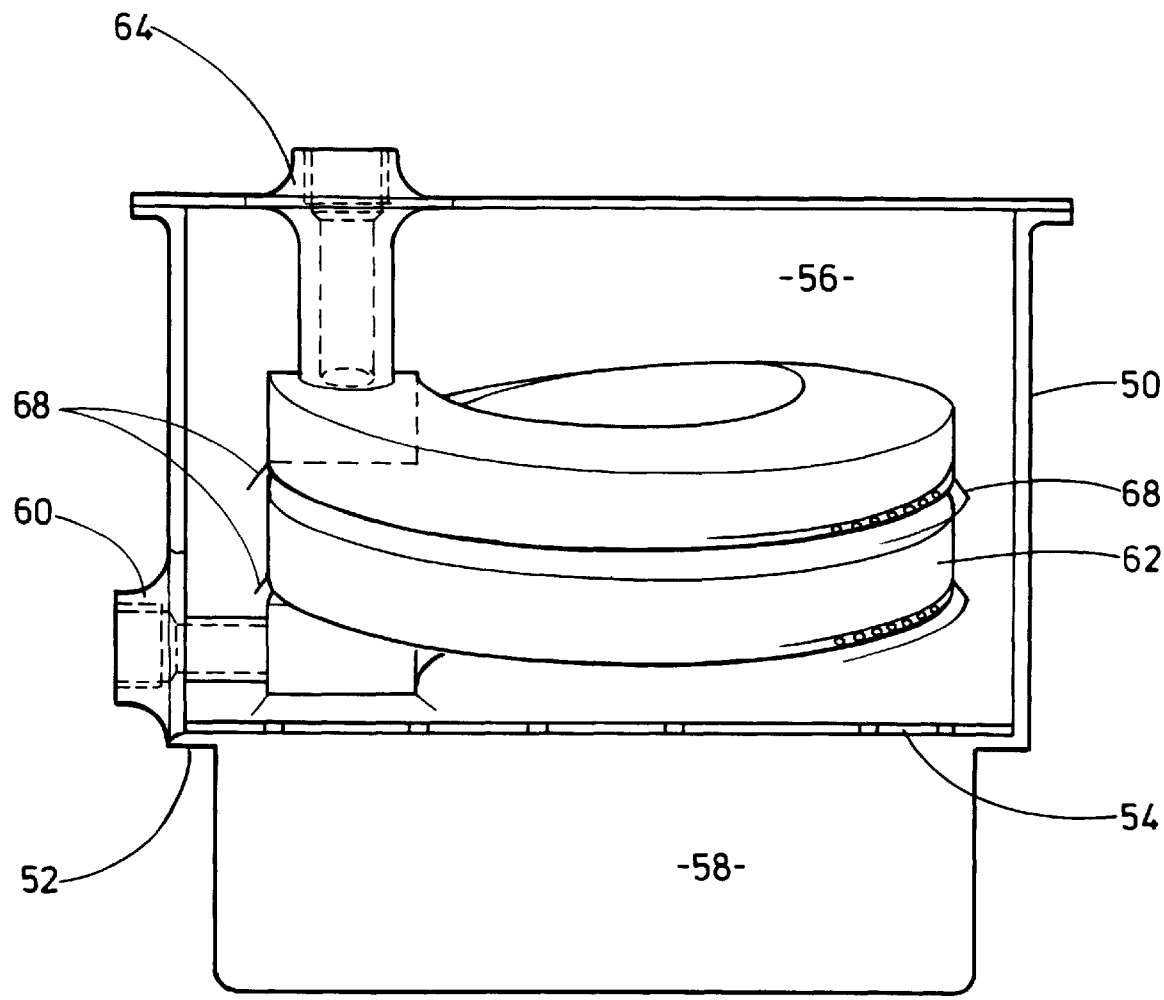
FIG. 6 is a view of a further alternative embodiment.

FIG. 6 illustrates a sedimenter which comprises a generally cylindrical housing 50 including a step 52 upon which a perforated plate 54 is mounted dividing the housing 50 into a sedimenter chamber 56 and a lower collection chamber 58. Although not illustrated, the collection chamber 58 is provided with an outlet, the flow through the outlet being controlled by a suitable tap arrangement as in the embodiments described hereinbefore.

The flow path defining means 62 comprises a tubular member of substantially rectangular cross-section which is wound so as to form a substantially helical shape, the lower end of the flow path defining means communicates with a radially extending inlet 60 whilst the upper end of the flow path defining means 62 communicates with an outlet 64 located on the upper surface of the housing 50.

Figure 7:
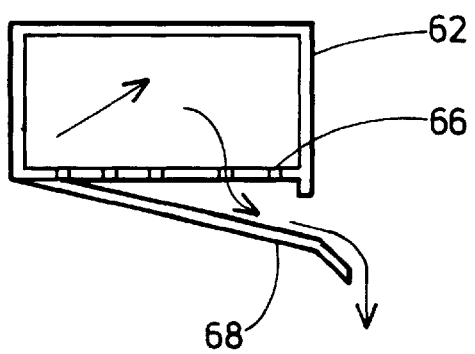
FIG. 7 is a sectional view of a part of the embodiment of FIG. 6.

As illustrated on FIG. 7, the lower surface of the tubular member forming the flow path defining means 62 is provided with perforations 66, and an angled deflector 68 is located beneath the tubular member so that contaminants which escape from the interior of the flow path defining means 62 through the openings 66 are deflected by the deflector 68 to flow downwards adjacent the edges of the housing 50 until the contaminants impinge upon the perforated plate 54, passing through the openings thereof and being collected in the collection chamber 58.

As in the previously described embodiments, this arrangement is advantageous compared to the known arrangements in that the effective area available for sedimentation is increased thus the efficiency of the sedimentation process is improved, the flow of fuel escaping from the sedimenter through the outlet 64 containing only relatively small diameter contaminants compared with those which are carried with the flow of fuel from a conventional sedimenter. As the diameter of particles escaping with the flow of fuel through the outlet 64 is reduced, the useful life of a filter located downstream of the sedimenter is improved.

Figure 8:
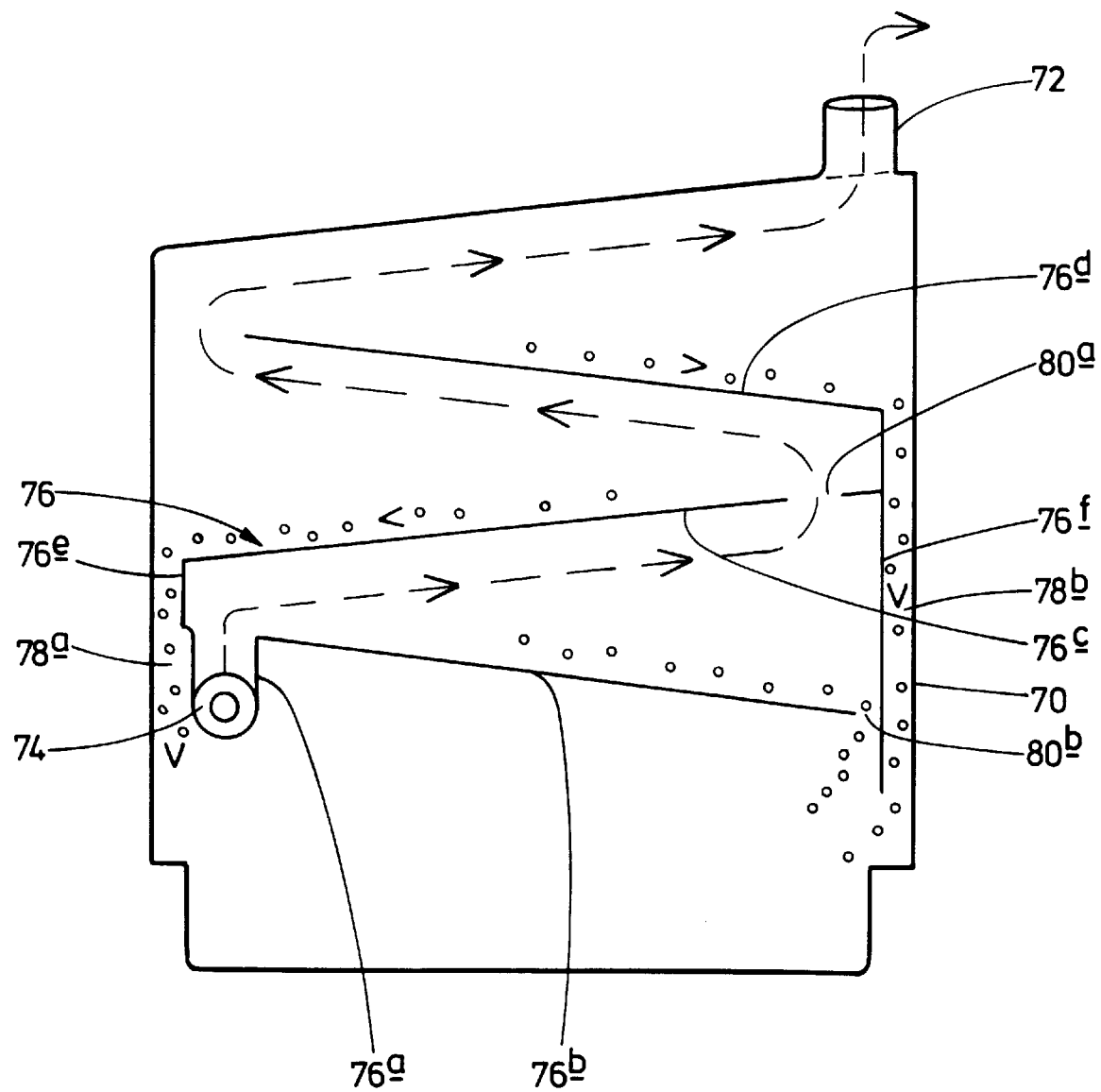
FIGS. 8 and 9 are views illustrating further alternative embodiments.

FIG. 8 illustrates an embodiment which comprises a housing 70 of substantially square or rectangular cross-section. At its upper end, the housing 70 includes an outlet 72. An inlet 74 is provided in one of the side walls of the housing 70. Flow path defining means in the form of a baffle 76 is located within an upper part of the housing 70.

The baffle 76 defines an inlet trough 76a into which the inlet 74 opens. A downwardly angled wall 76b is connected to one side of the trough 76a. An upwardly angled wall 76c extends adjacent the wall 76b, a further wall 76d being located above the wall 76c. End walls 76e, 76f connect the trough 76a and walls 76b, 76c, 76d to one another, and define, with opposite side walls of the housing 70, flow channels 78a, 78b which communicate with the lower part of the housing 70. Openings 80a, 80b are provided in the ends of the walls 76b, 76c remote from the trough 76a.

In use, fuel enters the trough 76a through the inlet 74 and flows through the volume defined between the walls 76b, 76c. Relatively dense contaminants tend to separate from the fuel, flowing towards and along the upper surface of the wall 76b and through the opening 80b to collect in the lower part of the housing 70 whilst the fuel flows upwards, through the opening 80a. The fuel then flows through the chamber defined between the walls 76c, 76d, further relatively dense contaminants tending to separate from the fuel and flowing along the wall 76c, subsequently flowing downwardly along the flow channel 78a and collecting in the lower part of the housing 70 whilst the fuel continues to flow upwards. The fuel subsequently flows around the end of the wall 76d and through the chamber defined between the wall 76d and the upper surface of the housing 70 to the outlet 72 whilst further contaminants carried by the flow of fuel separate therefrom and flow along the wall 76d, and through the flow channel 78b to the lower part of the housing 70.

It will be appreciated that the tortuous flow path between the inlet and outlet allows an increase in the available sedimentation area, resulting in the sedimenter being of improved efficiency.

Figure 9:
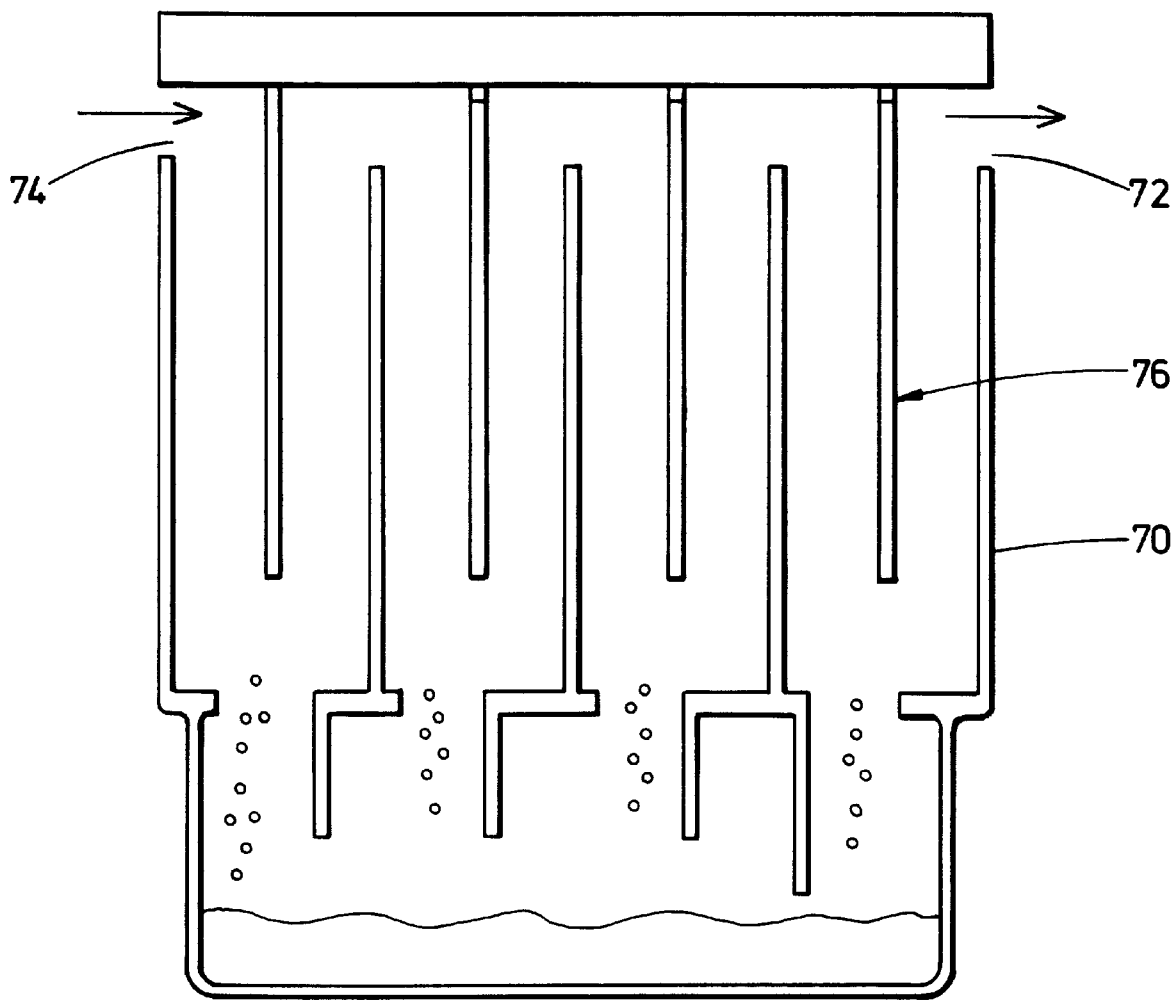

The arrangement of FIG. 9 differs from that of FIG. 8 in that the fuel flow path consists of a plurality of vertical paths defined by a baffle 76 located within a housing 70 having an inlet 74 and an outlet 72, both being located adjacent the upper surface of the housing 70. The baffle 76 is located within an upper, sedimenter region of the housing 70, a lower, collection region being located beneath the sedimenter region.

In use, fuel flow through the inlet 74 and is deflected downwardly by the baffle 76. The baffle 76 is shaped so that, subsequently, the fuel flows upwardly, relatively dense contaminants tending to be separated from the flow of fuel and continuing to flow in a downward direction to collect in the collection region. The baffle 76 is shaped to cause the direction of fuel flow to change repeatedly, until the fuel reaches the outlet 72.

In this embodiment, the tortuous nature of the flow path results in the fuel flow direction changing repeatedly, the contaminants separating from the fuel as a result of the momentum of the contaminants causing the contaminants to continue to move in the same direction whilst the fuel flow direction changes.

In each of the embodiments described in the present application, the presence of the flow path defining means significantly increases the path length of fuel flowing through the sedimenter. A typical conventional sedimenter has a diameter of 10 cm or less, and in such arrangements, the fuel flow path length is typically approximately 4 cm. In the illustrated embodiments, the path length is significantly increased, for example the embodiment of FIGS. 1 to 3 has a path length of over 100 cm, and the arrangements of FIGS. 8 and 9 have path lengths of 30 cm and 50 cm respectively.

The presence of the flow path defining means in each of the embodiments further reduces the risk of water already separated from the fuel moving to the outlet as a result of vehicle motion. The flow path defining means in each embodiment also results in the fuel flow path length being increased, the velocity of fuel flowing through the sedimenter being reduced, and the fuel flowing through the sedimenter being positively directed rather than being allowed to follow the shortest flow path between the inlet and outlet. The time taken for fuel to flow from the inlet to the outlet is increased, and as a result, the efficiency of separation of contaminants from the fuel is improved.

I claim:

1. A sedimenter for use in separating relatively dense contaminants from a flow of fuel, the sedimenter comprising a housing having an inlet and an outlet, the housing defining a contaminant collection chamber and a sedimentation chamber, the collection chamber being located beneath the sedimentation chamber and separated therefrom by a partition which is provided with openings to permit communication between the sedimentation chamber and the collection chamber, and flow path defining means located within the sedimentation chamber forcing fuel flowing between the inlet and the outlet to follow a tortuous flow path of relatively great length, wherein the inlet communicates with a part of the flow path located centrally within the housing, the outlet communication with a radially outer part of the flow path.

2. A sedimenter as claimed in claim 1, wherein the flow path defining means defines a spiral-shaped flow path.

3. A sedimenter as claimed in claim 1, wherein the flow path defining means is shaped to define a flow path having a first region, and a second region located directly above the first region.

4. A sedimenter as claimed in claim 3 wherein the first and second regions are separated by a wall, further comprising means whereby fuel can flow through or around the wall to move from the first region to the second region.

5. A sedimenter as claimed in claim 3, further comprising deflector means for directing separated contaminants towards the collection chamber.

6. A sedimenter for use in separating relatively dense contaminants from a flow of fuel, the sedimenter comprising a housing having an inlet and an outlet, the housing defining a contaminant collection chamber and a sedimentation chamber, the collection chamber being located beneath substantially the complete sedimentation area of the sedimentation chamber and communicating therewith, and flow path defining means located within the sedimentation chamber forcing the fuel flowing between the inlet and the outlet to follow a flow path of relatively great length, wherein the flow path defining means defines a flow path in which the direction of fuel flow changes repeatedly, the flow path including a plurality of regions in which the fuel flows towards the collection chamber and a plurality of regions in which the fuel flows away from the collection chamber.

* * * * *